July 7, 1953 H. S. VAN BUREN, JR 2,644,215
SNAP FASTENER SOCKET ASSEMBLY
Filed Oct. 21, 1950
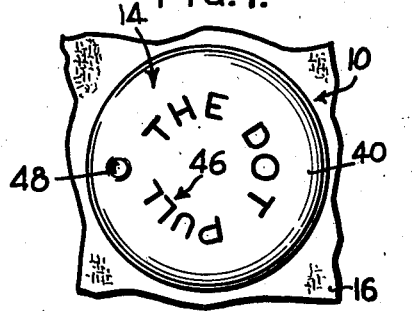
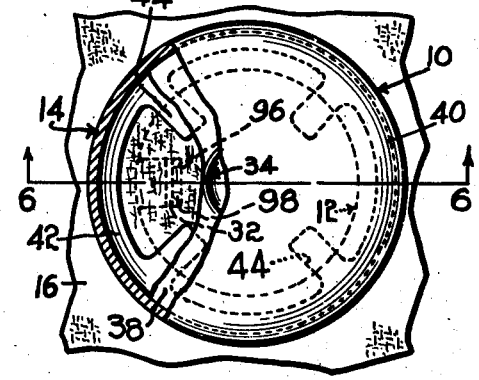
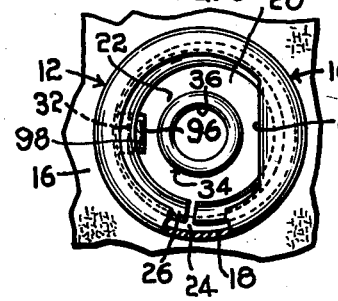
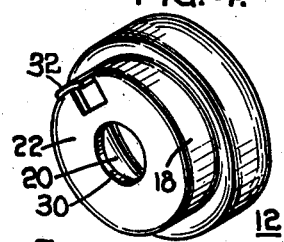
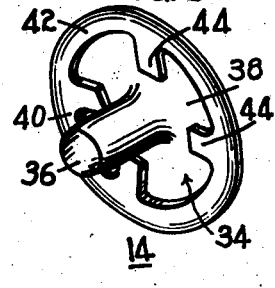
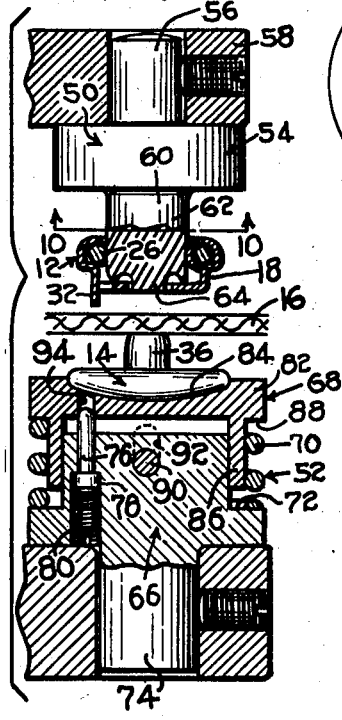
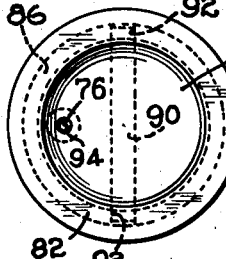
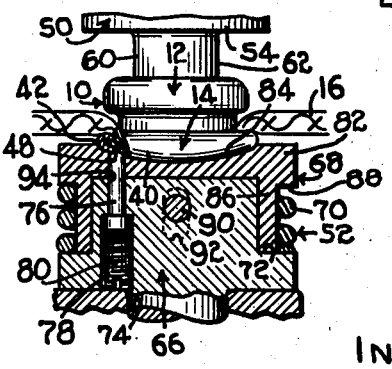
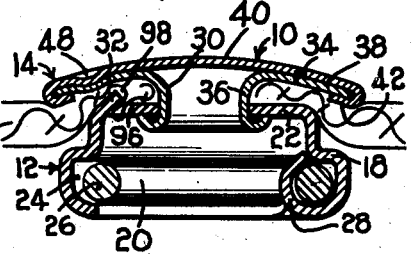
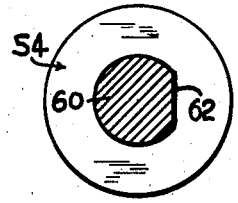
INVENTOR:
HAROLD S. VAN BUREN JR.,
BY Robert E. Ross
AGENT.

Patented July 7, 1953

2,644,215

UNITED STATES PATENT OFFICE 2,644,215

SNAP FASTENER SOCKET ASSEMBLY

Harold S. van Buren, Jr., Cambridge, Mass., assignor to United-Carr Fastener Corporation, Cambridge, Mass., a corporation of Massachusetts Application October 21, 1950, Serial No. 191,408

4 Claims. (Cl. 24—218)

This invention relates generally to snap fasteners, and has particular reference to a three-side-lock snap fastener socket assembly and to a method for attaching the socket assembly to a supporting member.

Many types of fasteners are known in which a socket member is so constructed as to engage a shouldered stud in such a manner that disengagement can be effected only by a separating force applied to a predetermined side of the assembly. Such fasteners are commonly called three side lock fasteners, since the stud and socket are locked against disengagement on the sides other than the one predetermined side. To assemble this type of fastener onto a supporting sheet, the socket must ordinarily be oriented in relation to the sheet so that the unlocking side is disposed in a predetermined desired direction, and when such sockets are attached by automatic machines, some means must be provided on the socket to be engaged by a positioning mechanism of the machine to accomplish such orientation. The socket must also be provided with means for effecting a positive engagement with the sheet to prevent rotation of the socket relative thereto after attachment, and since the direction of the unlocking side of the assembly may not be readily apparent, indicia must be provided on an exposed portion of the assembly to indicate the unlocking side.

These indicia are usually applied to the attaching member which secures the socket to the supporting sheet, and consequently the attaching member must also be oriented in a predetermined direction and in non-rotative relation to the supporting sheet.

The object of the invention is to provide a three-side-lock socket assembly in which cooperating means are provided on a socket and an attaching member to prevent relative rotation of the parts after assembly.

A further object of the invention is to provide a three-side-lock socket assembly in which means is provided on a socket to engage a supporting member to prevent rotation of the socket relative thereto and is adapted to compress a portion of the supporting member between projecting portions on an attaching member to prevent rotation of the attaching member relative to the socket.

A still further object of the invention is to provide a three-side-lock socket assembly in which an orienting tab projecting from the socket for engagement with the positioning mechanism of an automatic machine is adapted to engage a portion of a supporting sheet after attachment and to cooperate with projecting portions on an attaching member on the other side of the sheet to prevent relative rotation of the socket and the attaching member.

Another object of the invention is to provide a method of attaching a three-side-lock socket assembly to a supporting member in which indicia to indicate an unlocking side of the socket are applied to a portion of the assembly during attachment of said portion to the sheet to eliminate the necessity of orienting the said portion of the assembly during attachment.

In the drawing:

Fig. 1 is a plan view of a three-side-lock snap fastener socket assembly embodying the features of the invention;

Fig. 2 is a plan view, partly broken away, of the assembly of Fig. 1 without the indicia, to illustrate certain features of the invention;

Fig. 3 is a bottom plan view of the assembly of Fig. 1;

Fig. 4 is a perspective view of a socket member used in the assembly of Fig. 1 prior to attachment to a supporting sheet;

Fig. 5 is a perspective view of an attaching member for use in the assembly of Fig. 1;

Fig. 6 is a view in section taken on line 6—6 of Fig. 2;

Fig. 7 is a plan view of the face of a die for use in attaching the socket member to a supporting sheet;

Fig. 8 is a view in elevation, partly in section, of an attaching mechanism having the components of the socket assembly mounted thereon in position for attachment to a supporting sheet;

Fig. 9 is a view similar to Fig. 8 which illustrates the operation of the attaching mechanism; and Fig. 10 is a view in section taken on line 10—10 of Fig. 8.

Referring to the drawing, there is illustrated a three side lock snap fastener socket assembly 10, which comprises a socket member 12 and an attaching member 14 for assembly onto opposite sides of a supporting sheet 16.

The socket member 12 comprises a hollow sheet metal body 18, having an opening 20 at one end to receive a shouldered stud (not shown) and a base 22 at the other end. The body 18 is provided with an internal annular recess 24 adjacent the opening 20, which contains a split ring spring member 26 capable of expansion into the recess 24 to pass over the enlarged portion of a shouldered stud. To provide a three side lock feature to the socket, a locking tab 28 is provided on the body at the opening which extends into the opening over the spring and is curled downwardly under the spring. With this construction a shouldered stud may not be disengaged by a separating force applied on the side of the socket having the tab 28 nor by a force applied to the portion of the socket at right angles to the tab, but only by a separating force applied on the side directly opposite the tab. The operation of this particular type of three-side lock is more fully described in my copending application Serial No. 191,406, filed October 21, 1950, and is shown here only as being illustrative of one type of three side lock fastener which is adapted for use with the present invention.

The base 22 is provided with a central opening 30, and a tongue 32 which is formed from the metal of the base near the edge thereof, and extends outwardly from the plane of the base for a purpose to be hereinafter described.

The attaching member 14 comprises an eyelet 34 having a tubular barrel 36 for extending through the supporting sheet 16 for engagement with the base of the socket in the opening 30 and a flange 38 disposed on the end of the barrel, and a cap 40 which is assembled over the flange 38. The cap 40 has a peripheral portion 42 which is curled under the flange 38 to retain the cap in assembly thereon, and a series of arms 44 which are disposed against the under side of the flange and extend inwardly toward the barrel 36. As illustrated in Fig. 5, the arms 44, by reason of the thickness of the metal of which they are formed, project from the underside of the flange.

The cap 40 is preferably provided with indicia 46 on the surface thereof prior to attachment to provide directions for unlocking the assembly and the attached cap is provided with other indicia such as an embossed dot 48 positioned on the unlocking side. In the preferred embodiment, the dot 48 is not provided on the unassembled cap, but is embossed thereon during the attaching operation as will be hereinafter described.

Referring now to Figs. 7–10, there is illustrated a punch 50 and a die 52 for use in attaching the socket and the attaching member to the supporting sheet. The punch 50 comprises a base 54 having a shaft 56 for attachment to a punch support 58, and a punch portion 60 extending downwardly from the base to receive a socket member 12 thereon. The punch portion 60 is provided with a flattened side 62 to cooperate with the locking tab 28 on the socket to permit the socket to be assembled onto the end of the punch in such a manner that the socket cannot rotate relative to the punch during the attaching operation. The end of the punch is also provided with a curling portion 64 which is adapted to engage the end of the barrel 36 during attachment to curl said end outwardly into the position shown in Fig. 6.

The die 52 comprises generally a body portion 66 and a die portion 68 which are so assembled with an operating spring 70 so as to allow the die portion 68 vertical movement in relation to the body portion. The body portion 66 is provided with a flange 72 disposed about the lower end thereof to provide a seat for one end of the spring, and to enable the body to be attached to a supporting member, a shaft 74 extends downwardly therefrom. An embossing pin 76 is assembled into a vertical opening 78 in the body, and projects from the upper surface thereof. The pin 76 is held rigidly in the body, and is maintained in position by means of a set screw 80 disposed in the opening 78 below the pin. The die portion 68 is provided with a base 82 having a concave die face 84 which conforms to the shape of the cap 40 of the attaching member, and a depending peripheral wall 86 which is disposed about the die body 66. The wall 86 is spaced inwardly from the outer edge of the base 82 to provide a flange portion 88 for bearing against the upper end of the operating spring 70. To limit the vertical movement to prevent rotary movement of the die portion and the body portion relative to each other, a pin 90 is provided in the body 66, which extends from the sides of the body into vertically elongated openings 92 on opposite sides of the wall 86 of the die portion. The base 82 of the die portion is also provided with an opening 94 in alignment with the embossing pin which connects to the concave die face 84 near the periphery thereof.

To attach the component parts of the socket assembly to the supporting sheet, the attaching member is placed on the die face, and the socket member is mounted onto the end of the punch so that the punch enters the stud opening 20, and is retained therein by the socket spring 26. Both the attaching member and the socket member may be automatically placed in the position for attachment illustrated in Fig. 8 by other portions of the attaching machine (not shown), in which case the socket member will be oriented by a portion of the machine acting on the tongue 32, which is in a predetermined known position in relation to the unlocking side of the socket, and consequently the socket member may be fed to the punch with the unlocking side in a predetermined relation to the supporting sheet 16. The attaching member 14 which, prior to attachment, has only the indicia 46 disposed thereon, need not be oriented in relation to the supporting sheet for reasons which will appear hereinafter. The punch and die are then forced together, causing the barrel 36 to pierce the supporting sheet and enter the opening 30 in the base of the socket and engage the curling portion 64, so that the end of the barrel is turned outwardly to engage the inside of the socket base 22 to retain the parts in assembly. At the same time the tongue 32 flattens inwardly so that a portion of the supporting sheet is confined between the end of the tongue and the adjacent edge 96 of the base thereby preventing rotary movement of the socket on the supporting sheet. As illustrated in Fig. 6, the tongue is not completely flattened, but after attachment is inclined at an angle to the base, so that a portion 98 of the supporting sheet disposed above the tongue is compressed against the attaching cap more tightly than the rest of the sheet disposed under the cap. This compressed portion of the sheet preferably protrudes between a pair of arms 44, and thereby prevents rotary movement of the cap relative to the socket.

During the attaching operation, the downward force of the punch is transmitted to the die portion 68, and forces the die portion downwardly relative to the body portion, compressing the spring 80, thereby allowing the embossing pin to protrude slightly above the die face 84. Since the cap 40 of the attaching member is being forced against the die face by the punch, the embossing pin thereby forms the embossed dot 48 on the cap. Since the die and the punch are always aligned in the same direction relative to each other, and the socket is also in a known alignment on the punch, the dot will always be applied to the cap on the same side relative to the unlocking side of the socket.

After the attaching stroke, the punch is retracted, and since the socket member is now attached to the supporting sheet, the punch pulls out of the socket, and release of the punch pressure allows the spring 70 to lift the die portion 66 into position for another attaching operation.

Since the attaching member need not ordinarily be oriented for attachment, the positions of the arms 44 in relation to the position of the tongue 32 are not controlled by the attaching machine. Hence in some cases the tongue may be positioned directly over an arm after attachment. It, however, has been found that if the tongue 32 is appreciably wider than the arms, in these cases the tongue will provide sufficient pressure against the supporting member to cause the portion of the supporting member immediately adjacent the arms to be forced against the flange of the eyelet, so that rotation of the attaching member is prevented by the edges of the arm engaging the compressed portion of the cloth on either side thereof.

One of the major advantages of the present construction is that the supporting member is pierced by the fastener only at the center of the assembly. It has been found that when the fabric to which a snap fastener is attached is pierced by any portion of the fastener near the outer edge thereof, the fabric tends to tear at the point of piercing when the supporting sheet is pulled to unsnap the fastener. In the present construction the tongue 32 does not pierce the supporting sheet, but merely grips the surface thereof, so that the danger of tearing during use of the fastener is greatly reduced.

Another advantage of the device is that since orientation of the attaching member is not required, the machinery for automatic attachment is much simpler, and the possibility of misalignment during attachment is eliminated.

Although in the illustrated embodiment the tongue 32 serves first as means for orienting the socket and then as means for gripping the supporting sheet to prevent rotation of the socket and as means for preventing rotation of the cap, it will be understood that separate means may be provided on the socket for accomplishing each of these results.

Since certain other obvious changes may be made in the device without departing from the scope of the invention, it is intended that all matter contained herein be interpreted in an illustrative and not in a limiting sense.

I claim:

1. A three side lock snap fastener socket assembly comprising a socket member and an attaching member for assembly onto opposite sides of a supporting sheet, said attaching member being adapted to receive indicia thereon to indicate an unlocking side of the socket member and having radial projecting portions disposed on the inner side to project toward the supporting sheet, said socket having a projecting portion to engage a portion of the supporting sheet during attachment to prevent rotation of the socket relative thereto, said projecting portion being disposed on the socket to compress a portion of the supporting sheet between the projecting portions on the attaching member to prevent rotation of the attaching member relative to the socket so that the indicia will be retained in the correct angular relation to the socket.

2. A three-side-lock snap fastener socket assembly comprising a socket member and an attaching member for assembly onto opposite sides of a supporting sheet, said attaching member being adapted to receive indicia thereon to indicate an unlocking side of the socket and comprising means for extending through the sheet for engagement with the socket, a flange member on said means, and radial projecting portions on said attaching member on the side adjacent the supporting sheet, said socket member having means projecting therefrom for confining a portion of the supporting sheet against the base to prevent rotation of the socket relative thereto, said means on the socket member being disposed to force a portion of the supporting sheet between the projecting portions on the attaching member during attachment to prevent rotation of the portion of the attaching member which is to receive the indicia relative to the socket.

3. A three-side-lock snap fastener assembly comprising a socket member and an attaching member for assembly onto opposite sides of a supporting sheet, said attaching member comprising means for extending through the sheet for engagement with the socket to retain the parts in assembly on the sheet, a flange member on said means, and a cap assembled over said flange to receive indicia for indicating an unlocking side of the socket, said cap having arms extending under the flange, said socket having means disposed thereon to project toward the sheet after assembly to engage the sheet to prevent rotation of the socket thereon and to compress a portion of the supporting sheet between the arms on the cap to prevent rotation of the cap relative to the socket.

4. A three-side-lock snap fastener assembly comprising a socket member and an attaching member for assembly onto opposite sides of a supporting sheet, said attaching member comprising an eyelet having a barrel for extending through the supporting sheet for engagement with the socket member and a flange on the barrel, and a cap assembled on the flange to receive indicia to indicate an unlocking side of the assembly, said cap having a series of arms extending under the flange, said socket having an attaching base with an opening to receive the barrel of the eyelet, and a tongue formed from the metal of the base providing an opening therein, said tongue being spaced from the center of the base to provide means for engagement with orientation mechanism of an automatic machine, and being inclined outwardly from the plane of the base so that during attachment said tongue is forced back toward the opening to confine a portion of the supporting sheet against an edge of the opening, and said tongue compresses a portion of the supporting sheet between adjacent arms of the cap to prevent rotation of the cap relative to the socket.

HAROLD S. van BUREN, Jr.

References Cited in the file of this patent

UNITED STATES PATENTS

| Number | Name | Date |
|---|---|---|
| 673,866 | Tyson | Aug. 23, 1901 |
| 2,244,885 | Langley | June 10, 1941 |
| 2,325,929 | Amesbury | Aug. 3, 1943 |
| 2,328,016 | Huelster | Aug. 31, 1943 |
| 2,441,573 | Huelster | May 18, 1948 |
| 2,552,764 | Bedford | May 15, 1951 |